Sept. 24, 1963  W. T. PATTON  3,104,568
SLIDE FASTENER REPAIR TOOL
Filed Dec. 18, 1961

INVENTOR.
Weaver Truett Patton
BY
ATTORNEY

United States Patent Office 3,104,568
Patented Sept. 24, 1963

3,104,568
SLIDE FASTENER REPAIR TOOL
Weaver Truett Patton, Weatherford, Tex.
(7213 Comanche, Fort Worth, Tex.)
Filed Dec. 18, 1961, Ser. No. 160,167
1 Claim. (Cl. 81—15)

This invention relates to a slide fastener repair tool, and it concerns more particularly a hand tool for use in repairing a slide fastener in place in a garment.

It has been customary heretofore to repair a slide fastener, in place in a garment, by affixing to the fastener in its open position, transversely thereof adjacent its normally closed end, a U-shaped metal clip which, in its flattened, folded position in which its legs are folded over its middle portion, prevents spreading apart of the two strips of fabric on opposite sides of the fastener which, with the slide element, comprise the fastener, the two strips each having secured thereto a series of fastener elements which are acted upon by the slide element to secure the opposing fastener elements of the respective strips in inter-locking engagement with each other, whereby the fastener is secured in its closed position, and acts as a stop to limit movement of the slide element in the direction of the adjacent ends of the strips.

An object of this invention is to provide a hand tool which is peculiarly adapted for use in repairing a slide fastener, in place in a garment, by affixing to the fastener in its open position, transversely thereof adjacent its normally closed end, a U-shaped metal clip, in the manner and for the purposes described.

The invention will be readily understood by referring to the following description and the accompanying drawing, in which.

Figure 1:
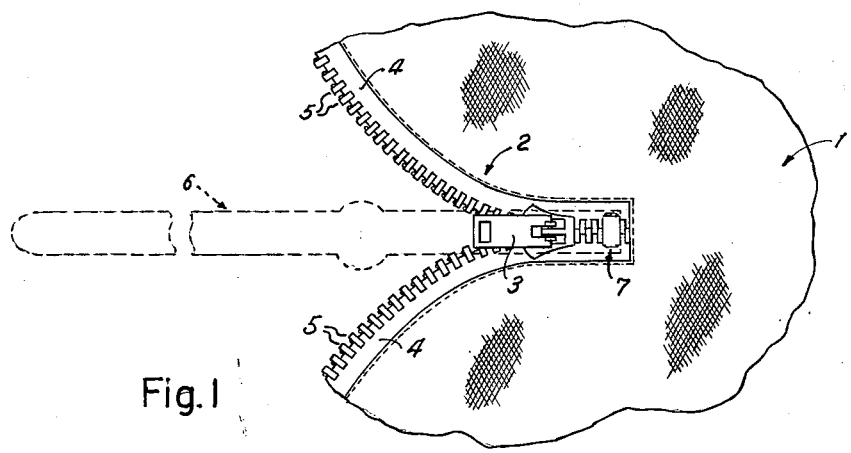
FIG. 1 is a diagrammatic view showing fragmentarily a slide fastener in place in a garment, and illustrating the manner in which the slide fastener repair tool of the invention, shown in dotted lines, is used.

As shown in FIG. 1, a garment, designated generally by the numeral 1, which is shown fragmentarily, has a slide fastener, indicated generally by the numeral 2, operatively associated therewith.

The slide fastener 2, which is shown in its open position, is of conventional design, and includes a slide element 3 and a pair of strips of fabric 4 on opposite sides of the fastener 2 having secured thereto a series of fastener elements 5 which are acted upon by the slide element 3 to secure the opposing fastener elements 5 of the respective strips 4 in inter-locking engagement with each other, whereby the fastener 2 is secured in its closed position.

The numeral 6 designates generally a tool embodying the invention, as hereinafter described, which is peculiarly adapted for use in repairing a slide fastener such as the slide fastener 2, in place in a garment such as the garment 1, by affixing to the fastener 2 in its open position, as shown in FIG. 1, transversely thereof adjacent its normally closed end, a U-shaped metal clip, one of which is indicated generally by the numeral 7.

The U-shaped metal clip 7, in its flattened, folded position in which it is affixed to the fastener 2, is passed thru the material of the respective strips of fabric 4 and has its legs folded over its middle portion whereby it embraces adjacent portions of the material of the strips 4 and prevents them from spreading apart, and also acts as a stop to limit movement of the slide element 3 in the direction of the adjacent ends of the strips 4.

The tool 6 includes a pair of elongated levers, designated generally by the numerals 8, 9, respectively, which are pivotally connected to each other intermediate their ends, as at 10, and have a pair of handles 11, 12 on one end thereof, respectively, and a pair of oppositely arched upper and lower jaws 13, 14 on the ends thereof opposite the respective handles 11, 12. The upper and lower jaws 13, 14 terminate in mutually opposed end portions 15, 16 having clip forming die surfaces thereon as hereinafter described.

Figure 3:
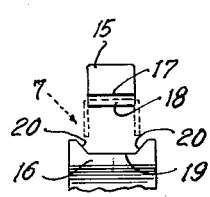
FIGS. 3 to 5, inclusive, are views on an enlarged scale showing details of construction.

As shown in FIG. 3, the end portion 15 of the upper jaw 13 has a flat die surface 17 forwardly thereof which is engageable over a middle portion of a U-shaped clip such as the clip 7, and has an abutment 18 rearwardly of the flat die surface 17 for abutting engagement with an adjacent edge of a clip 7 to position the clip 7 relative to the flat die surface 17 and to limit rearward movement of the clip 7 relative thereto.

The end portion 16 of the lower jaw 14 has a depressed, flat die surface 19 forwardly and centrally thereof which terminates in oppositely inclined, downwardly and inwardly extending surfaces 20 adjacent its side edges. The oppositely inclined surfaces 20 are engageable under the respective leg portions of a clip 7 whereby the leg portions are adapted to be folded over a middle portion thereof, and thereafter flattened in their folded positions by the action of the depressed, flat surface 19, to thereby secure the clip 7 to the material of the strips 4 upon advancing the end portions 15, 16 of the jaws 13, 14 relative to each other, above and below the clip 7, by manipulation of the handles 11, 12.

The length of the oppositely arched jaws 13, 14 is such that the jaws 13, 14 are adapted to straddle the slide element 3, in the open position of the fastener 2, as shown in FIG. 1, preparatory to affixing a clip 7 to the fastener 2, in place in the garment 1, as described.

A vertically disposed plunger 21 is passed thru an opening therefor in the upper jaw 13, rearwardly of its end portion 15, and is movable rotatably and reciprocally therein, as hereinafter described.

A relatively thin, elongated planar tongue-like element 22, which advantageously may be formed of spring steel, is disposed horizontally below the upper jaw 13 and has one of its ends rigidly connected to the lower end of the plunger 21, as hereinafter described, whereby it is rotatable 180 degrees from a forwardly extending position to a rearwardly extending position.

In its forwardly extending position the tongue-like element 22 is engageable under a middle portion of a U-shaped metal clip such as the clip 7 whereby it is adapted to support the clip 7 temporarily, preparatory to affixing it to a slide fastener such as the fastener 2, as described, and may be readily disengaged therefrom, after the clip 7 is in place, by adjusting the position of the tool 6 rearwardly relative thereto.

In its rearwardly extending position the tongue-like element 22 is disengaged from the end portions 15, 16 of the jaws 13, 14 whereby pressure may be applied to opposite sides of the clip 7 sufficient to flatten it.

Figure 2:
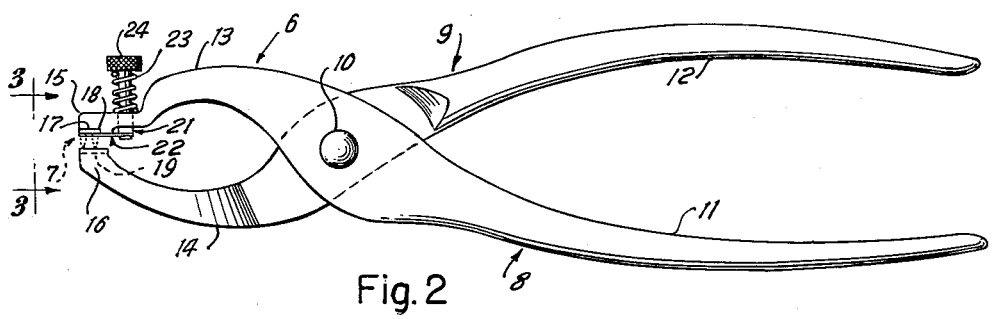
FIG. 2 is a side view of a slide fastener repair tool embodying the invention.

As shown in FIG. 2, the plunger 21 is biased in its uppermost position relative to the upper jaw 13 by a compression spring 23 which surrounds the plunger 21 and is positioned above the upper jaw 13 and acts on the upper jaw 13 and a knob 24 on the upper end of the plunger 21.

The lower end of the plunger 21 is polygonal, as at 25, and coacts with a correspondingly shaped opening therefor in the upper jaw 13 whereby the plunger 21, in its uppermost position, is secured against rotative movement, but may be rotated by manipulation of the knob 24 by depressing the plunger 21 against the resistance of the spring 23.

Figure 4:
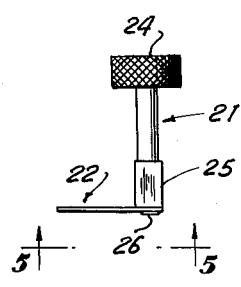
Figure 5:
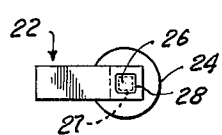

As shown in FIG. 4, the plunger 21 has a downwardly facing shoulder adjacent its extreme lower end, which is of reduced cross sectional area, as at 26. The tongue-like element 22 has a polygonal opening 27 in one of its end portions which is received on the lower end of the plunger 21, as shown in FIG. 5, in abutting relation to the downwardly facing shoulder thereof, and the material of the plunger 21 is spread outwardly below the tongue-like element 22, as at 28, whereby the tongue-like element 22 is rigidly secured to the plunger 21 and is rotatable therewith.

The invention may be modified in various ways without departing from the spirit and scope thereof.

I claim:

A hand tool for use in repairing a slide fastener in place in a garment comprising a pair of elongated levers pivotally connected to each other intermediate their ends and having a pair of handles on one end thereof, respectively, and a pair of oppositely arched upper and lower jaws on the ends thereof opposite the respective handles, the upper and lower jaws terminating in mutually opposed end portions having clip forming die surfaces thereon, the end portion of the upper jaw having a flat die surface forwardly thereof, and having an abutment rearwardly of the flat die surface, and the end portion of the lower jaw having a depressed, flat die surface forwardly and centrally thereof terminating in oppositely inclined, downwardly and inwardly extending surfaces adjacent its side edges, a vertically disposed plunger passed thru an opening therefor in the upper jaw, rearwardly of its end portion, and movable reciprocally therein, the plunger being rotatable about its axis in its depressed position, a relatively thin, elongated planar tongue-like element disposed horizontally below the upper jaw and having one of its ends rigidly connected to the lower end of the plunger whereby it is rotatable 180 degrees from a forwardly extending position to a rearwardly extending position, spring means acting on the plunger and the upper jaw whereby the plunger is biased in its uppermost position, and mutually engaging means on the plunger and the upper jaw acting on the plunger in its uppermost position to secure it against rotative movement.

References Cited in the file of this patent

UNITED STATES PATENTS

| 638,468 | McKellops | Dec. 5, 1899 |
| 1,394,719 | Evenden et al. | Oct. 25, 1921 |

FOREIGN PATENTS

| 162,694 | Australia | May 4, 1955 |